United States Patent [19]
Albert

[11] 3,936,827
[45] Feb. 3, 1976

[54] SECURE HYPERBOLIC GUIDANCE USING NOISE SIGNALS AND CORRELATION DETECTION

[75] Inventor: Joseph J. Albert, Timonium, Md.

[73] Assignee: Martin Marietta Corporation, Orlando, Fla.

[22] Filed: May 22, 1956

[21] Appl. No.: 586,538

[52] U.S. Cl. ....... 343/105 R; 244/77 B; 343/100 CL
[51] Int. Cl.² ........................................... G01S 1/30
[58] Field of Search ........... 244/77 B; 343/105, 106, 343/103, 100 CL

[56] References Cited
UNITED STATES PATENTS
2,580,148  12/1951  Wirkler................................. 250/20
2,698,935  1/1955  Sitterly................................. 343/103

Primary Examiner—Verlin R. Pendegrass
Assistant Examiner—Harold Tudor
Attorney, Agent, or Firm—Julian C. Renfro

[57] ABSTRACT

A method for use in controlling the flight of an aircraft which includes radiating from two base stations respectively a first noise signal and a second noise signal identical to said first noise signal but at a slightly different frequency and at a controlled interval with respect thereto, receiving both of said signals at said aircraft, simultaneously deriving at said aircraft a first oscillating voltage related to the envelope of the correlation function of said signals at a first delay time therebetween and a second oscillating voltage related to said envelope of said correlation function of said signals at a second delay time therebetween, subtracting said voltages to yield a difference voltage, and utilizing said difference voltage to control the airfoils of said aircraft.

16 Claims, 12 Drawing Figures

INVENTOR
JOSEPH J. ALBERT

BY Julian C. Renfro
ATTORNEY

INVENTOR
JOSEPH J. ALBERT

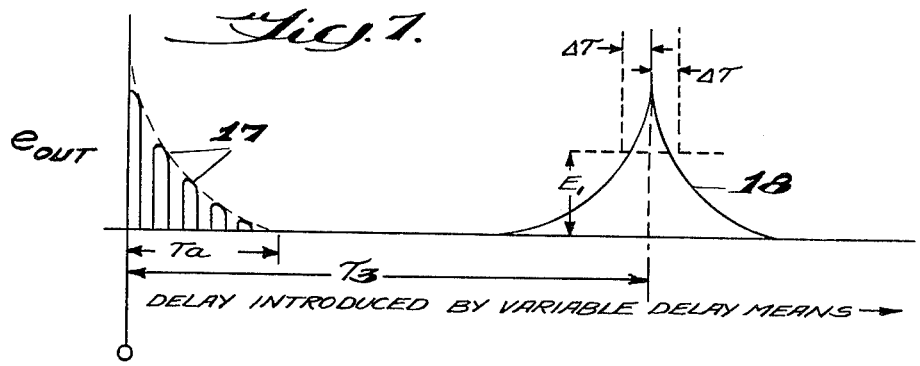
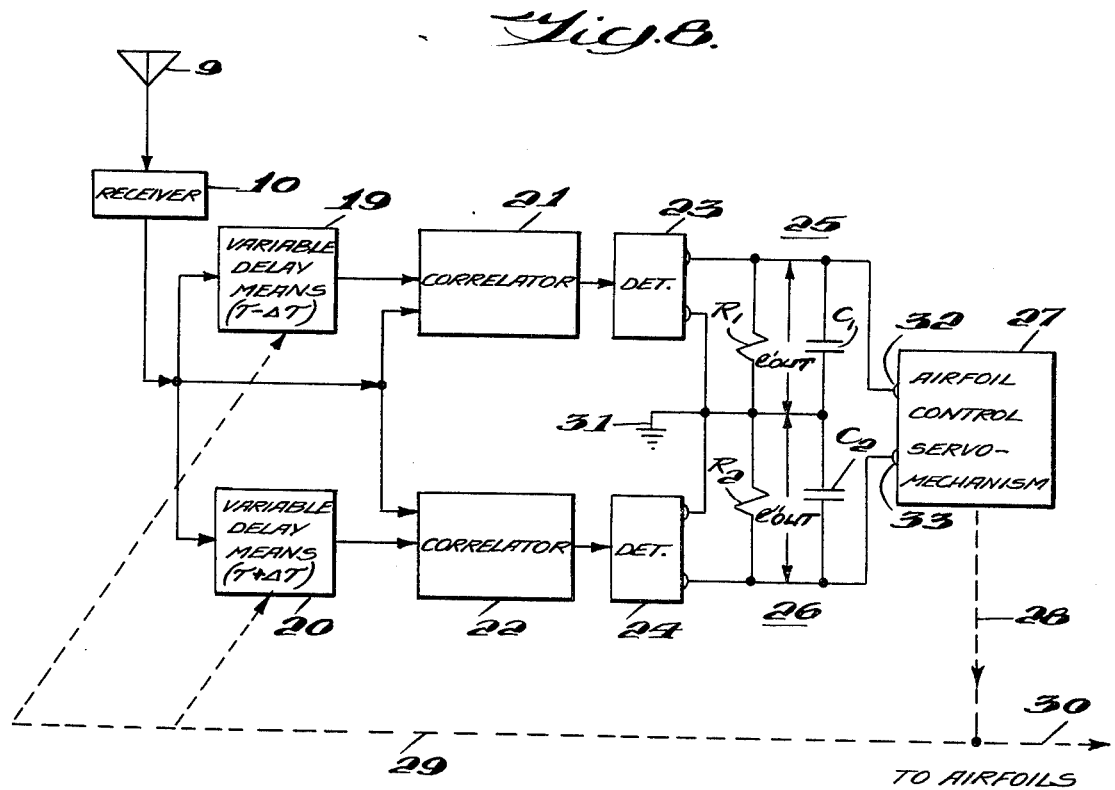

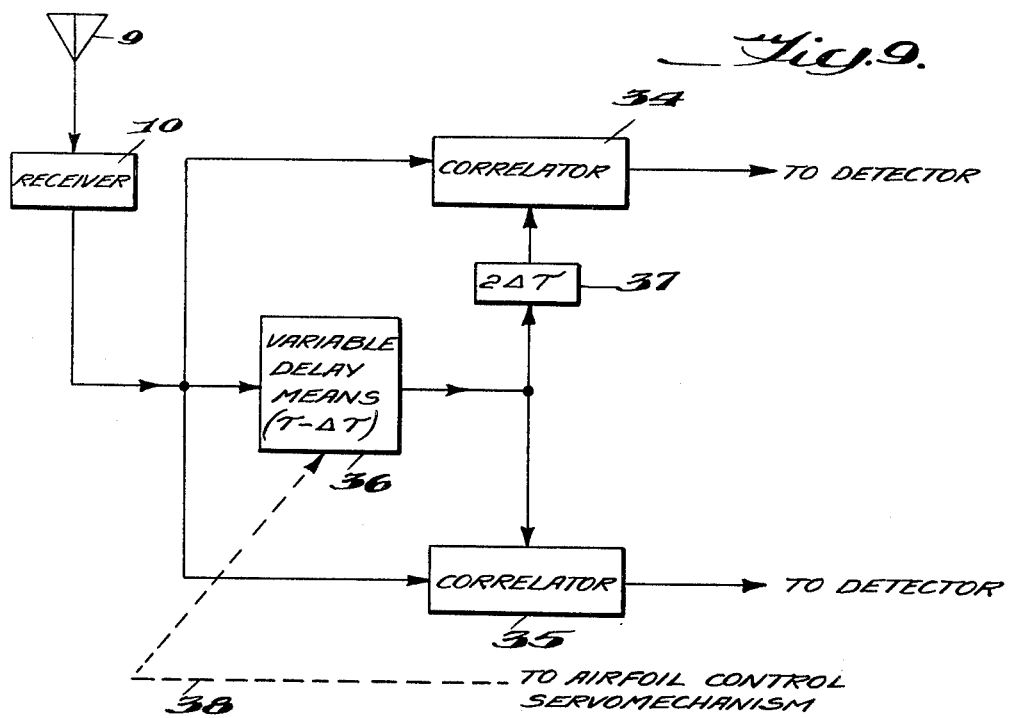
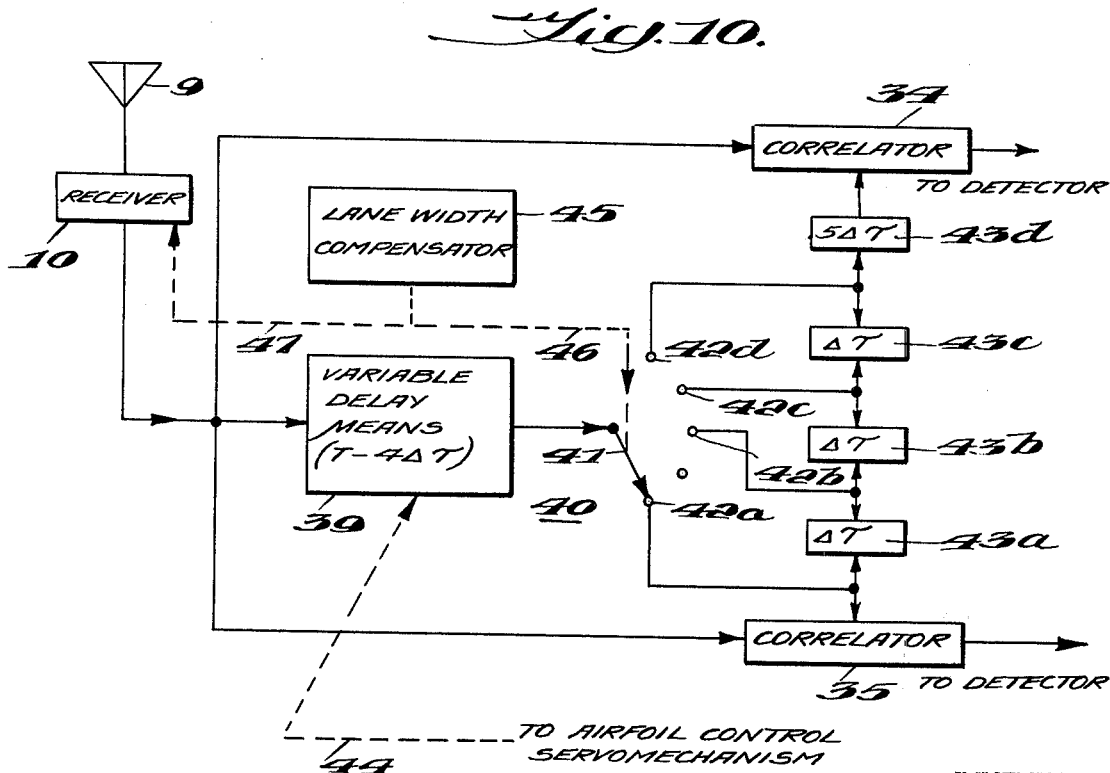

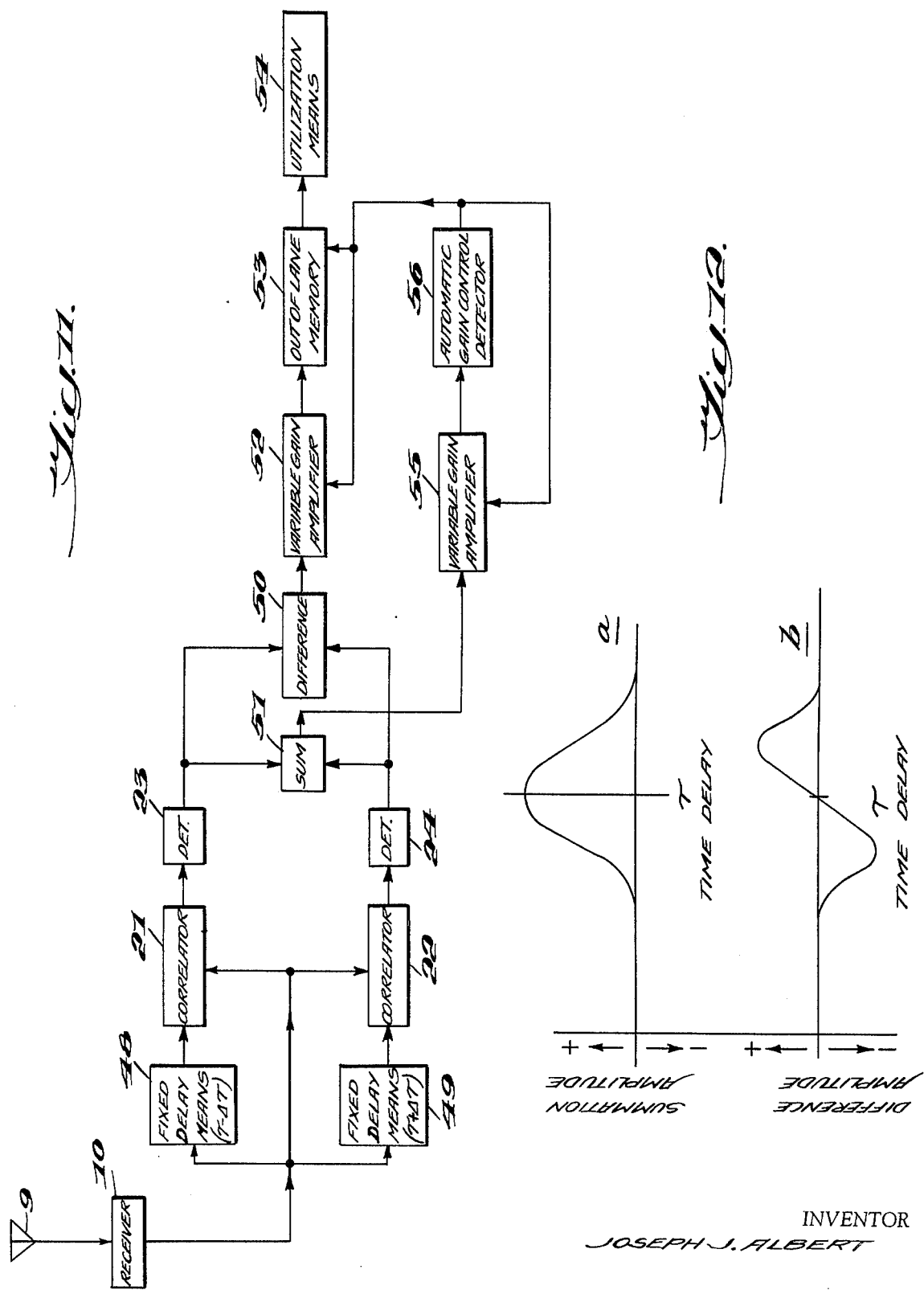

SECURE HYPERBOLIC GUIDANCE USING NOISE SIGNALS AND CORRELATION DETECTION

This invention relates to the guidance of vehicles, such as aircraft, by advanced hyperbolic guidance, and more particularly to the use of noise signals and correlation detection in hyperbolic guidance in order to obtain operation as either a secure system or an essentially jam-proof system.

A known arrangement for remotely controlling guided missiles has involved radiating signal pulses from a pair of spaced transmitters, and providing means within the missile for receiving these pulses and actuating the control surfaces of the missile in accordance with the time delay between the received signal pulses. The flight path of the missile will be hyperbolic in nature when the time delay between the received signal pulses remains constant. For various values of time delay there are respective hyperbolic flight paths which may be plotted to form a family of hyperbolic curves. It is therefore obvious that the missile may be brought over a target zone by merely selecting the proper hyperbolic path.

However, previous hyperbolic guidance systems had limited military application for the guidance of missiles and the like, because of their susceptibility to detection and jamming. This is due to the fact that earlier systems employed conventional signals and conventional detection methods, which provided little or no improvement in signal-to-noise ratio.

According to the present invention, two pairs of spaced transmitters are used, much as in conventional hyperbolic systems, but with the conventional signals being replaced by noise signals, and the conventional detection methods used in the vehicle being replaced by correlation detection. The spaced transmitters provide signals which, when measured for delay or path length difference, establish hyperbolic contours. By the use of two pairs of spaced transmitters, a hyperbolic grid can be established. This is accomplished by having the hyperbolas of one pair of transmitters intersect the hyperbolas of the other pair. Obviously, a single point in a plane can be defined by such a grid, and by providing suitable measuring equipment aboard a vehicle, it is possible to navigate to a particular intersection of hyperbolas.

Aircraft can thus be guided by a secure electronic guidance techniques which will be virtually undetectable by enemy receivers and hence immune from jamming. More particularly, the invention contemplates a method and system wherein continuous signals of weak noise are radiated to an aircraft to form guidance signals which are incoherent to enemy receivers, and which render the aircraft secure from the possibility of being diverted from its course by extraneous enemy signals. Alternatively, noise signals of moderate power can be used to realize a system that is relatively immune to jamming.

A specific method of guiding a vehicle according to this invention utilizes first and second spaced base stations and comprises the steps of radiating first and second noise signals from said first and second stations, respectively, with the noise signals being identical except for being centered at different frequencies, and with the noise signal from the second station being delayed with respect to the noise signal from the first station so that contours of constant delay constitute a family of hyperbolas. The signals from the base stations are received in the vehicle to be controlled as composite signal in which the individual noise signals are time-displaced by a finite interval. Delayed signals are created in the vehicle by delaying the composite signal by a first amount equal to the chosen delay in the signals from the stations minus a small increment of delay, and by a second amount equal to the chosen delay in the signals from the stations plus a small increment of delay. Each of the delayed signals is multiplied by the undelayed signal from the stations to generate a difference frequency at the output of each multiplier. This output is filtered in order to realize signal-to-noise improvement. These operations of delaying, multiplying, and filtering constitute correlation detection, and improvement in signal-to-noise ratio over conventional detection is thereby realized. This characteristic of the system permits its operation as either a secure system or a system which is virtually immune to jamming.

The magnitude of the difference frequencies present in the multiplier output are a function of the displacement of the vehicle from the desired hyperbola established by the base stations. Therefore, by detecting the difference frequency signals and taking the difference between the d.c. voltages thus generated, an error signal is provided which can be utilized to operate the control surfaces of the vehicle to cause the vehicle to seek the desired hyperbola generated by the base stations.

If desired, this invention can be utilized in conjunction with a reference base station, and at least two other base stations, with the stations being arranged in the form of first and second pairs of spaced base stations. Although three stations can constitute the two pairs of stations, the use of four stations can provide better geometry in the form of almost perpendicular crossings of hyperbolas from the two pairs of stations. By utilizing two pairs of stations rather than a single pair, a hyperbolic grid can be created such that the intersection of two hyperbolas defines a unique point in the plane containing the base stations. Thereupon, when the vehicle crosses this point, it could, for instance, go into a programmed maneuver to seek another hyperbola, and in this manner be enabled to travel more directly to a given point than by following the first-traveled hyperbola. Or, when the intersection point is crossed, the control system of the vehicle could automatically switch to a different type of guidance system, such as for an automatic landing.

If the vehicle involved is a military aircraft or missile, upon crossing the intersection point, the control system of the craft could throw it into a dive so as to strike the target at high speed. Alternatively, this could establish arming, timing, or detonating signals with respect to the warhead of the craft.

That the present guidance system could properly be utilized in conjunction with a rapidly moving vehicle, at least one refinement of the basic concept is desirable, namely, lane-width compensation based upon changes in band width and delay, which are controlled by a timing device.

It will be appreciated that there are two basically different ways of introducing delay in the receiver of the vehicle. In one case, fixed delay is employed and in this instance, an out-of-lane memory system is necessary in order to accommodate flight paths which deviate from a desired hyperbola by amounts which are large in comparison with the reciprocal of signal band width. This is because the correlation between the noise signals decreases in magnitude rapidly as delay is increased beyond the reciprocal of band width.

The other manner of introducing delay is by the use of a servocontrolled delay line which seeks to minimize the difference between the output signals of the multipliers, in which case the deviation of the vehicle from the desired hyperbola is available to the control surfaces of the vehicle in the form of the difference between the delay line setting and a reference.

By the proper selection of frequencies, this invention can be utilized in the guidance of various vehicles, including land-based or waterbased vehicles.

Accordingly, an object of this invention is to provide a method and system for secure electronic guidance of vehicles, such as aircraft. Another object of this invention is to provide a control system which is operative in response to weak continuous random noise signals.

Still another object of this invention is to provide an advanced hyperbolic guidance system utilizing noise signals and correlation detection in order to accomplish secure operation.

Yet another object of this invention is to provide for military aircraft a new type of guidance system employing signals which are virtually undetectable by enemy receivers.

A further object of this invention is to provide a moderately powered hyperbolic grid navigational system which is immune from the influence of enemy transmitted extraneous signals.

A still further object of this invention is to provide a means for establishing aircraft guidance systems in various cities throughout a country whereby said systems will not interfere with one another, nor will there be interference between said systems and other radiated energy operated equipments.

The invention will now be described in detail in connection with the accompanying drawings, in which.

Figure 6:
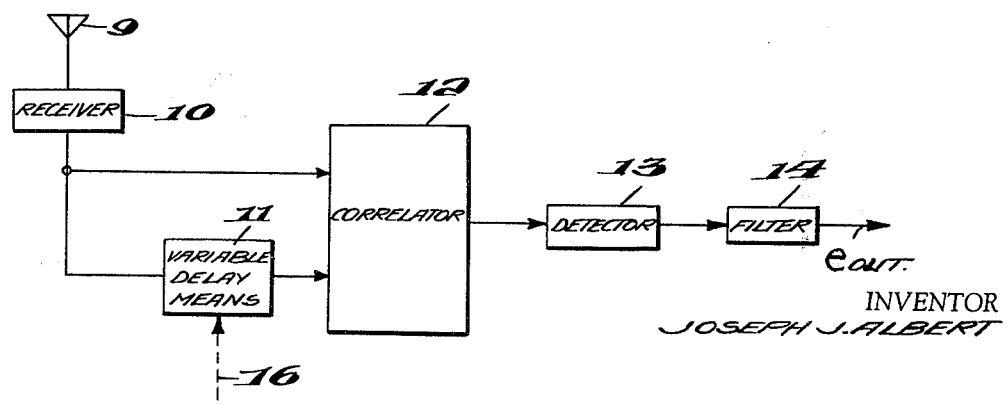
FIG. 6 is a block diagram of a means of detecting the composite signal from a pair of stations M and S, and which permits the measurement of time delay between the noise signals.

FIG. 7 indicates the output voltage of the system of FIG. 6, measured at different values of delay;

FIG. 8 is a block diagram illustrating the basic operation of an elementary receiver according to this invention;

FIG. 9 is a block diagram of a portion of the elementary receiver of FIG. 8, and illustrates an alternate distribution of delay;

FIG. 10 is a block diagram of a portion of the receiving system such as may be employed in a missile, and it illustrates a practical distribution of delays, representing a refinement of the arrangement shown in FIG. 9;

FIG. 11 is a block diagram of a complete receiver according to this invention, with the lane width compensation of delay (FIG. 10) being omitted for the sake of clarity;

FIG. 12a illustrates the output of the summation circuit of FIG. 11 at different values of delay; and FIG. 12b illustrates the output of the difference circuit of FIG. 11 at different values of delay.

Figure 1:
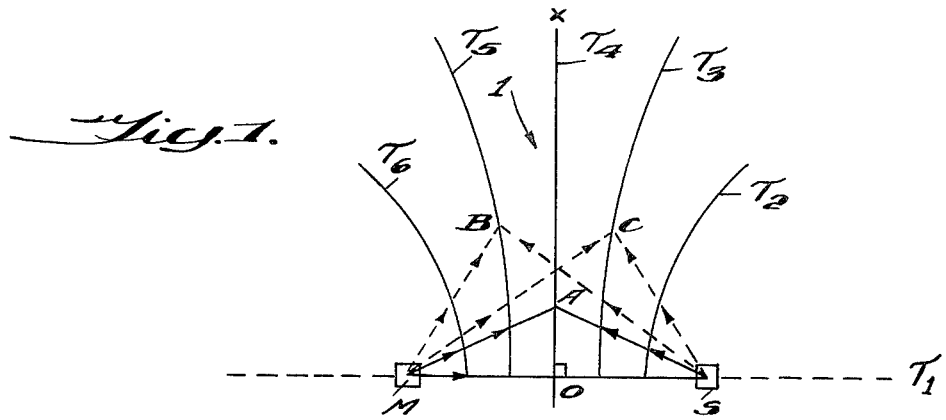
FIG. 1 represents the geometry of the system according to this invention, and shows the hyperbolic grid established by generating equi-delay contours in the vicinity of the base stations.

Referring most particularly to FIG. 1, base stations M, S are located on a base line MOS, with a line XAO representing the perpendicular bisector of the base line MOS. The numeral 1 indicates generally a family of hyperbolic curves which individually represent a plot of the flight path of a missile when the time delay between the signals received from the stations M,S remains constant. These curves will hereinafter be referred to as paths.

When the master station M and the slave station S are synchronized and transmitting simultaneously, signal pulses from both stations will arrive simultaneously at any point along the perpendicular bisector XAO. Conversely, if the master station M transmits a signal pulse directly to point A and to the slave station S, where the pulse is received and immediately reradiated, this latter pulse will arrive at point A somewhat later than the direct signal pulse from M. In other words, the indirect signal pulse transmitted via the slave station S will always arrive at a point A delayed by a finite time interval. Further, because of the geometry of the system, the two signal pulses arriving from the base stations M, S at any point along the perpendicular bisector XAO will always exhibit exactly the same time difference.

While in this case the line connecting all of these points with the same time difference comprises the line XAO, it will be apparent that there are many other points where equal time differences of other values exist, and that if a series of points with any one value of time-delay are connected a hyperbolic flight path is plotted. For various values of time difference a series of these hyperbolic paths may be drawn, and these comprise a family of hyperbolic constant time-delay paths.

It will now be obvious that a pilotless missile which is equipped to receive, measure, and utilize the time difference between pulses of radiant energy received from base stations M, S can easily be directed to the target area. By measuring deviations in the time difference received while in flight, and utilizing the deviation as an error signal for an airfoil control servomechanism which controls the missile heading accordingly, the missile is forced to fly along the particular hyperbolic flight path which passes through the target.

Because of the fact the hyperbolic paths are symmetrical on either side of the perpendicular bisector XAO, a possibility for ambiguity could exist if the stations M, S were synchronized in certain ways; for simultaneous transmission for example. (The hyperbolic paths are not symmetrical with respect to both sides of the base line MOS as directional antennas are employed.) The apex B of triangle MBS would then lie on a path which possesses the same constant-delay as the line which intersects the apex C of triangle of MCS. For this reason it is customary to have the slave station S triggered by the signal from the master station M, thus providing such a relationship as will yield minimum delay only along the extension of the base line MOS from S outwardly to the right. All other paths, chosen in an anticlockwise direction from the zero-delay line at OS-extended, possess successively larger values of constant delay, and reach a maximum at OMextended. Hence, for each value of time-delay there exists a single unique hyperbolic guidance path for the air-borne missile, and these paths may be conveniently designated by their values of delay, for example $\tau_1$, $\tau_2$, $\tau_3$, etc., as will be seen in FIG. 1. The Greek letter tau is employed in this connection as being the symbol most commonly understood in the art as representing delay, and is further used in the interest of making a distinction from the symbol T or t, ordinarily used to indicate time in the common sense when running against a scale with a predetermined instant as a fixed datum.

Figure 2:
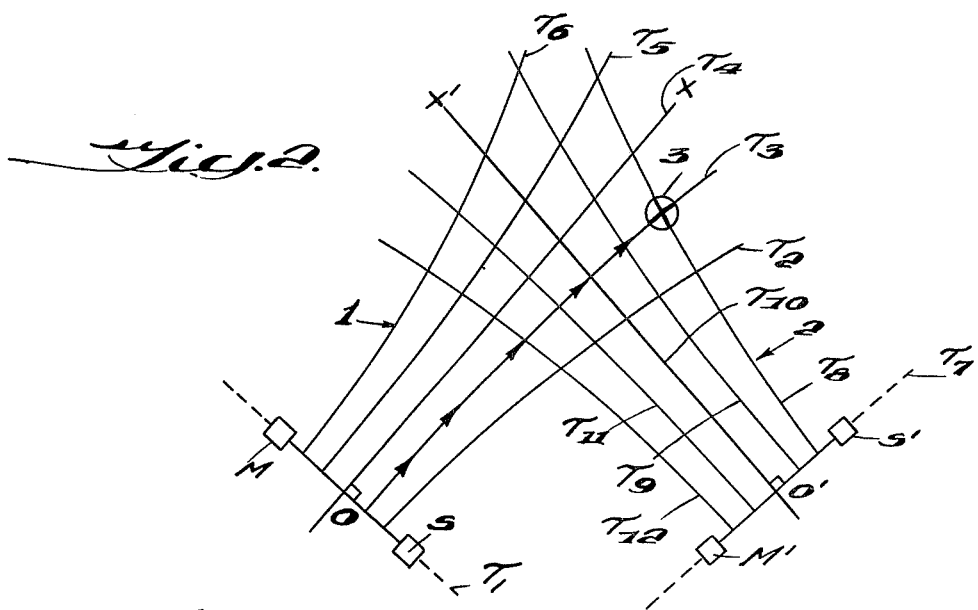
FIG. 2 shows a pair of intersecting hyperbolic grids and illustrates the unique location of a point in a plane at the intersection of two hyperbolas.

Referring now to FIG. 2, the numeral 1 designates generally a family of hyperbolic paths, and the numeral 2 indicates generally a second family of hyperbolic paths. The families of paths 1 and 2 have been superimposed to form a single system of hyperbolic grid coordinates. Since the system associated with the family of paths 2 comprises a counterpart of the system associated with the family of paths 1 it will not be described in detail. It is sufficient for purpose of this specification to state that the system associated with the family of paths 1 comprises a master station M and a slave station S located on the base line MOS, and that the system associated with the family of paths 2 comprises a master station M', and a slave station S' situated on the base line M'O'S'; that each system is equipped to radiate a direct and an indirect signal; and that the superposition of the two systems with base line M'O'S' angularly located with respect to base line MOS defines a complete system of hyperbolic grid coordinates. In operation, a target 3 is destroyed by guiding the missile along the proper hyperbolic path $\tau_3$, as established by the stations M, S. Means within the missile are provided to "read" the delay-time between the signals received from stations M', S'. Upon crossing the proper time-delay path, as illustrated by the family of curves 2, the missile-borne means generates a dive-signal which properly aligns the airfoils for the terminal dive on the target.

In view of the dependence of these known systems on time differences only, it will be readily apparent that reception of extraneous signal pulses could easily result in routing the missile along an incorrect path or generating a premature dive-signal. In order to avoid such occurrences, the present invention undertakes to teach a system of hyperbolic navigation which is substantially less vulnerable to such extraneous control signals.

Figure 3:
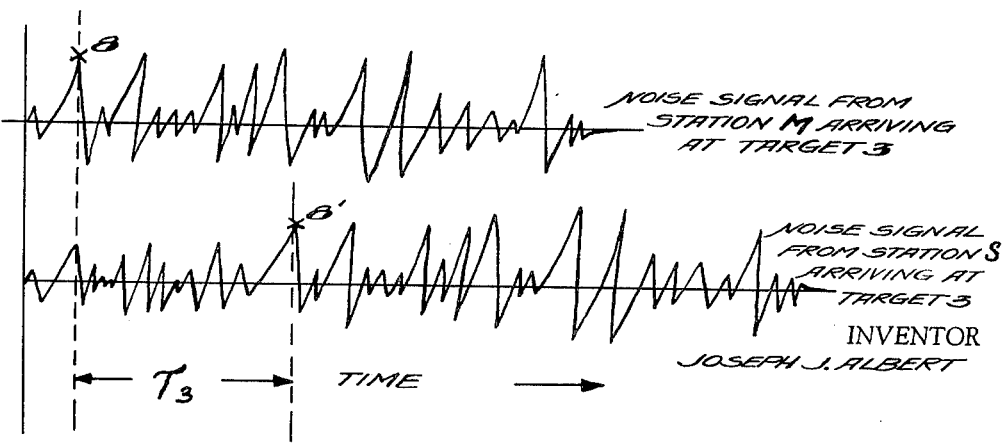
FIG. 3 represents the signals received at target 3 from stations M and S.

Referring again to FIG. 1, the signal which is transmitted from master station M according to this invention will comprise weak continuous noise in a band several megacycles wide which is radiated directly to the field indicated by the numeral 1. This noise signal of several megacycles bandwidth which is radiated from the master station M should have a center frequency of at least 15 megacycles and preferably has a center frequency of about 20 megacycles, which furnishes sufficient groundwave propagation to yield a range of 550 statute miles from the farthest transmitter to a missile at 40,000 feet altitude when using a practical amount of transmitter power. Furthermore, this noise signal comprises a completely random function, and appears to enemy receivers only as an increase in noise power which can be made small over much of the useful range. The noise signal from master station M is radiated to the slave station S and is there translated and reradiated into the hyperbolic field. The noise radiated by the slave station S is centered at a slightly different frequency from that radiated by the master station M and arrives later than the master station signal at any point in the hyperbolic field 1, but is substantially similar in form to the noise signal from station M. This is illustrated in FIG. 3 wherein the noise signals arriving at the target 3 are displaced by a time delay $\tau_3$; i.e., the portion of the station S signal at the point 8' will arrive at the target 3 at an interval $\tau_3$ after the arrival of the portion of the station M signal at the point 8. The direct noise from M, and the indirect noise from S will of course add together and merge in space, to form a composite noise function which is substantially unintelligible to enemy receivers. Therefore, at any given point in the said hyperbolic field 1, the composite function represents the sum of the direct noise function and the indirect noise function which has a slightly different frequency and is delayed by a finite interval. For different points in the hyperbolic field this finite time interval will exhibit different values because of the difference in the path lengths which the direct and indirect signal must traverse. If the time interval between the two component functions which comprise the composite noise function is determined from every point in the field 1, and if points having the same value are connected, there is once again formed a family of hyperbolic constant time-delay paths. It will now be apparent that with a system of circuitry which can analyze the composite noise function anywhere in the field to determine the time delay at any point therein, and generate adequate error signals in response to deviations therein, it is possible to utilize noise signals alone in guiding a missile along a hyperbolic path to the target area.

As an understanding of the basic fundamentals of correlation detection is necessary to fully comprehend the present invention, a somewhat simplified explanation thereof is presented at this point.

Assume that a continuous carrier signal is multiplied by itself. As the signals are in phase, the product will contain positive excursions only which, when filtered, will produce a positive d.c. voltage output. If one of the signals is delayed by 180°, a negative d.c. voltage output will be produced by the filter. It is therefore obvious that the filtered product of the signals will be a fixed d.c. voltage for a fixed delay and that it will oscillate, with a constant level envelope, as a function of the delay (note: The output will not oscillate as a function of time unless the delay is varied as a function of time.).

Figure 4:
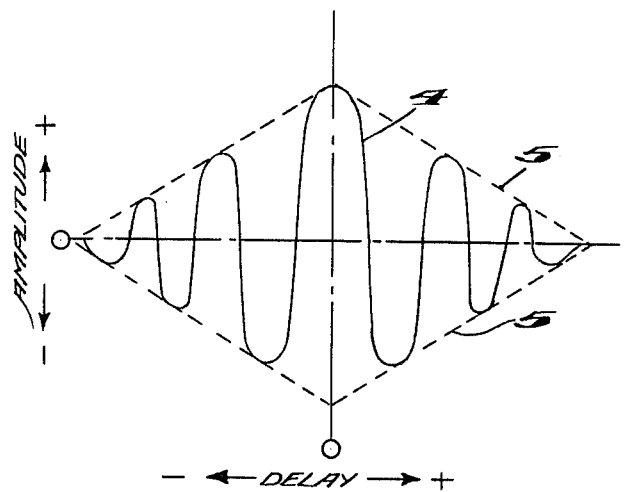
FIG. 4 is a portion of the correlation function of a typical pulsed carrier.

If the aforementioned signal is the carrier for a series of pulses and the series of pulses is multiplied by itself, the filtered product will be positive in polarity but smaller in amplitude because of the long time intervals between pulse pairs. It will be appreciated, in view of the discussion in the above paragraph, that the output of the filter will oscillate as a function of the delay between the carriers (note: It is to be remembered that the output will not oscillate as a function of time unless the delay is varied as a function of time.). If the pulses of the delayed carrier are delayed in a similar manner, the envelope of the oscillating filtered output will decrease in a linear fashion until the output equals zero at the point where the delay equals (1/pulse length). As the output is a function of the delay, a mirror image of the output will be produced for negative values of delay. The total output is called the autocorrelation function of a pulsed carrier. FIG. 4 is a plot of an output signal 4 as a function of delay, while broken lines 5 represent its envelope.

Now assume that two series of pulsed carrier signals are available which are fixed in pulse-time relationship but the frequency of one carrier signal is slightly different from the other. Within any particular pair of pulses the phase angle between the carrier signals will change an infinitesimal amount and consequently for all practical purposes the delay between these carrier signals is constant throughout the pulse pair. Because the pulses are spaced at time intervals which are large relative to the pulse length, there will be a change in the phase angle between the carriers of any pair of pulses and a succeeding pair of pulses. Therefore carrier delay will occur as a function of time but pulse delay will be fixed. From the previous discussion, it will be readily appreciated that under these conditions the maximum amplitude of the filtered output will be limited by the fixed pulse-time relationship and the polarity and amplitude of the instantaneous output will be a function of carrier delay. Therefore the filtered output of the product of two series of pulses having a fixed pulse-time relationship and carrier frequencies relatively close together will oscillate as a function of time. A pictorial representation of this three dimensional phenomenon would be difficult to produce. The three axes would represent delay, amplitude and time, respectively, and sine wave configurations would exist in the delay-time and amplitude-time planes. FIG. 4 has two of these axes (delay and amplitude) but an appreciation for the three dimensional phenomenon may be gained by imagining a mutually perpendicular time axis along which the wave forms 4 oscillate, always remaining within the confines of the envelope 5.

The above three assumptions employing carrier signals having fixed frequencies and amplitudes have been presented to illustrate the basic principles of correlation detection. As the present invention employs correlation detection of continuous random function noise signals, the above basic principles will now be employed to help explain correlation detection of noise signals.

Figure 5:
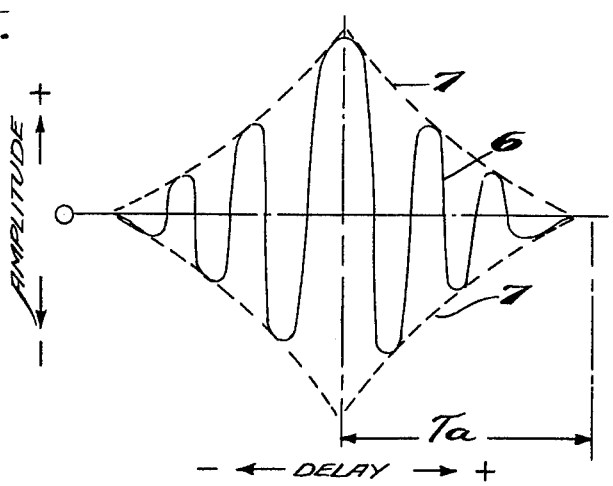
FIG. 5 represents the correlation function of a narrow band noise signal such as is employed in the present invention.

If a continuous random function noise signal which has been passed through a single resonance bandpass filter is multiplied by itself and filtered, a positive output signal will be obtained as in the above first assumption. If one of these signals is caused to be slightly delayed with respect to the other, the filtered output will decrease in amplitude. The output will oscillate as a function of the delay (the output will not oscillate as a function of time unless delay is a function of time), but the envelope of the oscillations will decrease in an exponential fashion as the delay is increased until at a particular value of delay the output will be substantially zero. This is illustrated in FIG. 5, wherein output signal 6 varies as a function of delay, broken lines 7 represent the envelope of the output signal 6, and $\tau_1$ represents the amount of delay necessary for the output to delay to substantially zero. This output signal 6 is different from the constant envelope output in the first assumption wherein continuous signals with fixed frequency and amplitudes were employed. This may be readily appreciated when it is considered that noise signals have random frequencies and amplitudes. The autocorrelation detection output signal 6 of random noise is more closely related to the output signal 4 of the second assumption wherein pulsed carrier signals were autocorrelated.

In the above paragraph, a continuous noise function was multiplied by itself. If one of these signals were translated to a slightly different frequency with the remaining information being retained (which is done in practicing the present invention), the output signal 6 of FIG. 5 would oscillate along a time axis in a manner similar to that described for the third assumption wherein two series of pulses having carriers of slightly different frequencies were employed. Therefore, for an original and a frequency translated noise signal, an output which oscillates as a function of time will be produced for any fixed value of delay not exceeding the value whereby the output is substantially zero. As previously stated, three dimensional pictorial representations of this type of phenomenon would be difficult to produce.

Although a random function noise signal which has been passed through a signal resonance bandpass filter was used as an example in the above paragraph, other filters may be employed as appreciated by those skilled in the art. Obviously, the envelope of the correlation function will be of a different form.

With this simplified explanation of correlation detection, the operation of the remaining portion of the invention will be more easily understood.

It will be appreciated that in addition to the composite noise signal hereinbefore mentioned, usual ambient noise signals will also be present but that the correlator will extract information from only the composite noise signal, thereby rejecting ambient background noise. This is an inherent quality of the correlator.

FIG. 6 is a block diagram of a system which will extract from a composite signal of the type hereinbefore described information indicative of the time-delay between the noise signals. An antenna 9 is connected to a receiver 10 which is conventional and is chosen according to the frequencies of the composite signal. The output of the receiver 10 is simultaneously coupled into a variable delay means 11 and a correlator 12 which is conventional and comprises a multiplier and a filter. The output of the variable delay means 11 is coupled into the second input of the correlator 12. The output of the correlator 12 is coupled into a detector 13 wherein it is rectified. A filter 14 is provided to remove the ripple from the output of the detector 13 and a mechanical means 16 is used to adjust the variable delay means 11. The output of the filter 14 is labeled $e_{out}$.

To assist in the explanation of the system illustrated by the block diagram of FIG. 6, a plot of $e_{out}$ as a function of the delay introduced by the variable delay means 11 is presented in FIG. 7. The particular composite signal input to the antenna 9 chosen to produce this plot is that existing along the hyperbolic path $\tau_3$ of FIGS. 1 and 2. Other values of $\tau$ will produce similar results. Waveforms 17, 18, incremental delays $\Delta\tau$, and voltage $E_1$ will be explained in conjunction with FIG. 6.

Referring now to FIGS. 5, 6, and 7, if the variable delay means 11 provided a delay varying from zero to $\tau_a$, the output of the correlator 12 would be represented by the waveforms 6 lying to the left of the vertical centerline of FIG. 5. This is readily appreciated when it is remembered that for delays not exceeding $\tau_a$, autocorrelation of the composite signal is taking place. When the output of the correlator 12 is subjected to the detector 13, only the positive values of signals 6 will be permitted to pass. The signals 6 represent d.c. values of voltage for various values of delay (that is, the signals 6 in this case do not oscillate along the time axis which, as hereinbefore discussed, is mutually perpendicular to the delay and amplitude axes). The waveforms 17 represent the output $e_{out}$ for values of delay between zero and $\tau_a$.

When the variable delay means 11 is adjusted to provide a delay of $\tau_3$, the composite signal to one input of the correlator 12 will be delayed sufficiently to cause the direct noise signal component in the delayed composite signal to become aligned in time relationship with its corresponding indirect noise signal in the undelayed composite signal. When this occurs, the conditions established in the last example (used herein in explaining correlation detection) exist and the correlator 12 will produce an output with will oscillate at a frequency equal to the difference between the frequencies of the direct and indirect noise signal. The detector 13 will rectify this output and the filter 14 will provide a smoothing action to produce a fixed d.c. signal at $e_{out}$. If the variable delay means 11 is varied slightly, the output from the correlator 12 will still be oscillatory in nature but will decrease in amplitude. This will cause the output $e_{out}$ to decrease in magnitude, which is illustrated by curve 18 in FIG. 7. When the variable delay means 11 is varied from a delay of $\tau_3$ by an amount $\Delta\tau$, the output $e_{out}$ will equal the voltage $E_1$.

Referring now to FIG. 8, a system is shown which illustrates the basic concept of the present invention. This system essentially comprises two of the systems depicted in FIG. 6 connected in a back-to-back fashion, and utilizes an antenna 9 and a receiver 10. The antenna, the receiver, the correlators 21, 22, the filters 25, 26, and the detectors 23, 24 are identical to their corresponding blocks found in FIG. 6. The variable delay means 19, 20 are similar in construction to the delay means 11 of FIG. 6 but are initially adjusted so that the delays introduced by them will differ by an amount equal to 2 $\Delta\tau$. This has been illustrated in the drawings by ($\tau-\Delta\tau$) and ($\tau+\Delta\tau$). The unsubscripted $\tau$'s are used to indicate the general case.) The filters 25, 26 respectively comprise resistor $R_1$, capacitor $C_1$, and resistor $R_2$, capacitor $C_2$. The outputs $e'_{out}$ and $e''_{out}$ will have a unilateral polarity, as is evident from FIG. 7. A like polarity terminal of each of the filters 25, 26 is connected to a ground connection 31, and the remaining terminals are coupled via terminals 32, 33 into an airfoil control servomechanism 27. The output of the airfoil control servomechanism 27 is in the form of mechanical motion and is conveyed by a mechanical means 28. A mechanical means 29 joins the mechanical means 28 to the variable delay means 19, 20, while a mechanical means 30 joins the mechanical means 28 to the airfoils which are to be controlled. It is to be understood that the output of the servomechanism could operate either an electrical or mechanical indicator which the pilot of a piloted aircraft could use in navigating.

The operation of the system of FIG. 8 is as follows: Assume that the aircraft in which this system is located is on hyperbolic path $\tau_3$ of FIGS. 1 and 2. When the variable delay means 19, 20 are adjusted via the mechanical means 29 so that the delays introduced are ($\tau_3-\Delta\tau$) and ($\tau_3+\Delta\tau$), respectively, then the outputs $e'_{out}$ and $e''_{out}$ will be equal, and the terminals 32, 33 will be at the same potential level with respect to ground. The airfoil control servomechanism 27 will not be activated. If the desired flight path is hyperbolic path $\tau_3$, then the airfoils should be aligned to maintain the aircraft in a straight line path when the delay means 19, 20 are adjusted for ($\tau_3-\Delta\tau$) and ($\tau_3+\Delta\tau$) respectively. If a different flight path is chosen, the airfoils will have to be readjusted with respect to the output of the servomechanism 28. Consequently an adjusting means may be provided in the mechanical means 30 for making these adjustments. This is not illustrated in FIG. 8 inasmuch as such means are well known to those skilled in the art and is not considered to form any part of the present invention. Now assume that the aircraft is on hyperbolic path $\tau_2$ and that the adjusting means in the mechanical means 30 have been adjusted for the hyperbolic path $\tau_3$. Under these last mentioned conditions, the variable delay means 19, 20 must be adjusted so that the delays introduced are ($\tau_2-\Delta\tau$) and ($\tau_2+\Delta\tau$), respectively, in order for the potentials with respect to ground of the terminals 32, 33 to be equal. For this to take place the servomechanism 27 must adjust the variable delay means 19, 20 so that these delays exist, and accordingly the airfoils will be adjusted by the mechanical means 30. The airfoils are moved in a direction to cause the aircraft to turn in the direction toward the hyperbolic path $\tau_3$. From these two assumptions, it is obvious that this system operates in a fashion to produce signals at the terminals 32, 33 which contain both polarity and amplitude information so that the servomechanism knows in which direction and how much to turn.

Referring now to FIG. 9, a block diagram is depicted of an alternate arrangement for the correlation detecting portion of the system of FIG. 8. The detectors 23, 24 of FIG. 8 and the circuitry following them may be connected to the output of correlators 34, 35, respectively, of FIG. 9 and consequently that portion of the system is not shown here. The antenna 9, the receiver 10, and the correlators 34, 35 are identical to their corresponding elements found in FIGS. 6 and 8. A variable delay means 36 is similar to the variable delay means 11, 19, 20 of FIGS. 6 and 8 is varied by a mechanical means 38. An incremental delay means 37 is connected between the output of the variable delay means 36 and one of the inputs to the correlator 34 and provides a delay of $2\Delta\tau$. The output of the variable delay means 36 is also connected to one of the inputs of the correlator 35. The operation of this particular arrangement is as follows: Assume that the airfoil control servomechanism has adjusted the variable delay means 36 via the mechanical means 38, to the point where the input to the airfoil control servomechanism has been reduced to zero. When the input to the servomechanism has been reduced to zero, the outputs of the correlators 34, 35 must be equal. This will occur when the delayed signal inputs to the correlators 34, 35 differ with respect to the delay between the direct and indirect signals contained in the composite signal input by equal amounts. Under these conditions, the delayed signal to the correlator 34 will be delayed by an amount equal to ($\tau-\Delta\tau+2\Delta\tau$), which equals ($\tau+\Delta\tau$). The delayed signal input through the correlators 35 will be ($\tau-\Delta\tau$), which is the conjugate to the delayed signal to the correlator 34.

FIG. 10 illustrates a system which incorporates a refinement of the system of FIG. 9. The variable delay means 36 of FIG. 9 has been replaced with a variable delay means 39. A switching arrangement 40 comprising an arm 41 and contacts 42a, 42b, 42c, 42d, is connected to the output of the variable delay means 39. A group of serially connected incremental delay means 43a, 43b, 43c, 43d provide delays equal to $\Delta\tau$ and incremental delay means 43d provides a delay equal to $5\Delta\tau$. The connection between the incremental delay means 43a and correlator 35 is joined to contact 42a; the connection between incremental delay means 43a, 43b, is joined to contact 42b; the connection between incremental delay means 43b, 43c, is joined to contact 42c; and the connection between incremental delay means 43c, 43d, is connected to contact 42d.

The combined operation of the variable delay means 39, the switching arrangement 40, and the incremental delay means 42a, 42b, 42c, 42d may be fully appreciated by remembering that for the outputs of the correlators to be equal, as was described with respect to FIG. 9, the delayed signals injected into the correlators 34, 35 must be conjugates. Therefore, the delay introduced by the variable delay means 39 in this particular arrangement must be equal to $(\tau-4\Delta\tau)$. This may be appreciated by referring to the following chart:

| Arm 41 Position | Correlator 34 Signal Delay | Correlator 35 Signal Delay |
|---|---|---|
| 42a | $(\tau-4\Delta\tau)+8\Delta\tau=\tau+4\Delta\tau$ | $(\tau-4\Delta\tau)+0=\tau-4\Delta\tau$ |
| 42b | $(\tau-4\Delta\tau)+7\Delta\tau=\tau+3\Delta\tau$ | $(\tau-4\Delta\tau)+\Delta\tau=\tau-3\Delta\tau$ |
| 42c | $(\tau-4\Delta\tau)+6\Delta\tau=\tau+2\Delta\tau$ | $(\tau-4\Delta\tau)+2\Delta\tau=\tau-2\Delta\tau$ |
| 42d | $(\tau-4\Delta\tau)+5\Delta\tau=\tau+\Delta\tau$ | $(\tau-4\Delta\tau)+3\Delta\tau=\tau-\Delta\tau$ |

The advantage of this refinement will be appreciated when it is remembered that the time-delay field is divergent in nature (see the hyperbolic paths of FIGS. 1 and 2). Because of this divergency, the gradient of the delay field decreases and consequently if it is desired to maintain a relatively constant channel width, it is necessary to make the apparatus progressively more sensitive to time delay. From the above chart, it is obvious that the system is most sensitive when the arm 41 is connected to the contact 42d. To provide a switching action, a lane width compensator 45, which essentially comprises a timing arrangement associated with expected missile speed, has one output connected via a mechanical means 46 to the arm 41. This compensator moves the arm 41 from contact to contact at a rate so that the delay time sensitivity of the equipment increases as the distance of the aircraft from the base line MOS increases. A further refinement may be provided by utilizing the output of the compensator 45 via a mechanical means 47 to adjust the sensitivity and bandwidth of the receiver 10. Increasing the bandwidth will increase the delay-time sensitivity, which will be appreciated by referring to FIG. 5 and the discussion associated therewith.

In the systems illustrated and described thus far, variable delay means have been required. It is possible to provide systems embodying the present invention which do not require variable delay means and consequently are less complicated and less expensive to produce. Such a system is shown in FIG. 11 wherein the configuration of the correlation detecting portion of the circuit is similar to that of FIG. 8 and consequently corresponding blocks have been assigned the same nomenclature. In place of the variable delay means 19, 20 of FIG. 8, fixed delay means 48, 49 have been provided. The filters 25, 26 of FIG. 8 have been combined in a difference circuit 50. A summation circuit 51 has been connected to the outputs of the detectors 23, 24. The output of the difference circuit 50 is connected to a variable gain amplifier 52, whose output is connected to an out-of-lane memory circuit 53. The out-of-lane memory circuit 53 has its output connected to a utilization means 54 which may comprise an airfoil control mechanism or a visual display means. A variable gain amplifier 55 has its input connected to the output of the summation circuit 51, while its output is joined to an automatic gain control detector 56. The output of the automatic gain control detector 56 is connected to the variable gain amplifier 52, the out-of-lane memory circuit 53, and the variable gain amplifier 55. The operation of this arrangement is now presented.

A plot of the output of the summation circuit 51 as a function of time-delay is illustrated in FIG. 12a, while a plot of the output of the difference circuit 50 is shown in FIG. 12b. These two curves are drawn to the same time-delay base. It will be noted that the zero points of the curve representing the output of the summation circuit 51 correspond to two of the zero points of the curve representing the output of the difference circuit 50.

Since the zero voltage error signal which accompanies extreme "off course" paths would appear to the utilization means 54 as a perfect "on-course" signal, a voltage must, under these conditions, be supplied from some other source in order to effect the realignment of the airfoils needed for correcting the flight path. To provide this voltage, the summation circuit 51, the amplifiers 52, 55, the detector 56, and the out-of-lane memory circuit 53 have been provided. These circuits cooperate to provide information to the utilization means 54 before the difference circuit 50 can supply erroneous information to it.

The variable gain amplifier 55 and the automatic gain control detector 56 provide an automatic gain control action to the output of the summation circuit 51 in a manner well known to those skilled in the art. The output from the detector 56 controls the gain of the amplifier 52. Obviously, when the output of the summation circuit 51 falls below a predetermined level, the output of the detector 56 will likewise fall. When the output of the detector 56 decreases to a predetermined value, the memory circuit 53 will function to remember the magnitude and the polarity of the error signal existing at that instant and will simulate, through an auxiliary voltage source contained in the memory circuit, this error signal during the time that the output of the difference circuit 50 is supplying what would constitute an erroneous signal. At the same time, the variable gain amplifier 52 is cut off by the detector 56 so that the memory circuit 53 supplies all of the information to activate the utilization means 54. Once the missile has returned to a sufficiently "on-course" position so that the error signal from the difference circuit 50 is adequate to properly control the utilization means 54, the output of the detector 56 will increase to the point where it is sufficient to activate the amplifier 52 and deactivate the memory circuit 53, thereby permitting the utilization means 54 to be controlled by the output of the difference circuit 50 once again.

The memory circuit 53 which responds to the amplified signal from amplifier 52 may be of any suitable design; the auxiliary voltage source in the memory circuit 53 may comprise a charged capacitor which excites the input stage of the utilization means 54 until the missile approaches the "on-course" position. However, since several suitable voltage-sensitive circuits and small voltage sources will serve equally well as a memory unit, it will be appreciated that the invention is not limited to any specific design but encompasses equally well all reasonable equivalents.

The use of the summation circuit 51, the amplifier 55, and the detector 56 to control the gain of the amplifier 52 and thereby render the displacement sensitivity independent of the composite signal strength may be utilized in the same fashion in the systems of FIGS. 8, 9, and 10.

Obviously, the variable delay means 36, 39 of FIGS. 9 and 10, respectively, may be replaced by fixed delay means if the arrangement following the correlators 21 22 of FIG. 11 is employed.

While the discussion has been limited to a fixed time-delay between the transmission of the direct and indirect signals, it is to be understood that the missile may be directed to a different hyperbolic path by changing the time-delay between the transmitted signals.

While the invention has been discussed with respect to guiding a missile, it should be obvious to those skilled in the art that the method and apparatus taught herein could be readily applied to any type of aircraft, and therefore is not limited to the missile type. In a piloted aircraft, a new hyperbolic path may be selected within the aircraft by merely changing the relationship of the airfoils with respect to the servomechanism in FIGS. 8, 9, and 10, while in FIG. 11 the fixed delay means 48, 49 must be changed.

The systems illustrated and discussed have been considered for guidance purposes only. Those skilled in the art will appreciate that two of these systems may be utilized to provide a navigational system of hyperbolic grid coordinates as hereinbefore discussed; the second system will supply information with respect to the aircraft's position along the flight path. When two or more of these systems are employed in an area where one may receive signals intended for the other, each system must have a different amount of frequency shift between the transmitted signals and/or be limited to a range of time-delays which will not interfere with the others. This has been illustrated in FIG. 2 by time-delays $\tau_1$ through $\tau_6$ for one system and time-delays $\tau_7$ through $\tau_{12}$ for the other system.

It will be apparent that in addition to precision guidance of military aircraft, the invention will readily lend itself to precision guidance of commercial aircraft. For example, these systems may be utilized in various cities for the control of all local air traffic. The frequency differences and time delay ranges may be varied as discussed in the previous paragraph and thereby eliminate the possiblity of interference between systems. Signals from adjacent systems would only appear as an increased ambient noise level and therefore would not interfere, as hereinbefore discussed.

It is to be understood that certain changes, modifications, and substitutions can be made without departing from the spirit and scope of the appended claims.

I claim:

1. A method for use in controlling the flight of an aircraft which includes radiating from two base stations respectively a first noise signal and a second noise signal identical to said first noise signal but at a slightly different frequency and at a controlled interval with respect thereto, receiving both of said signals at said aircraft, simultaneously deriving at said aircraft a first oscillating voltage related to the envelope of the correlation function of said signals at a first delay time therebetween and a second oscillating voltage related to said envelope of said correlation function of said signals at a second delay time therebetween, subtracting said voltages to yield a difference voltage, and utilizing said difference voltage to control the airfoils of said aircraft.

2. A method for use in controlling the flight of an aircraft which includes radiating from two base stations respectively a first noise signal and a second noise signal identical to said first noise signal but at a slightly different frequency and at a controlled interval with respect thereto, receiving both of said signals at said aircraft as a composite signal wherein said noise signals are time displaced by a finite interval, simultaneously delaying said composite signal by first and second amounts to provide two delayed and one undelayed composite signals which will permit correlation detection of said first noise signal in each of said delayed composite signals with said second noise signal in said undelayed composite signal, simultaneously deriving two oscillating signals by correlation detection of each of said delayed composite signals with said undelayed composite signal, simultaneously rectifying and filtering said oscillating signals to derive respective d.c. voltages, subtracting said d.c. voltages to derive the voltage difference therebetween, and utilizing said voltage difference to control the airfoils of said aircraft.

3. A method for use in controlling the flight of an aircraft which includes radiating from two base stations respectively a first noise signal and a second noise signal identical to said first noise signal but at a slightly different frequency and at a controlled interval with respect thereto, receiving both of said signals at said aircraft as a composite signal wherein said noise signals are time displaced by a finite interval, delaying said composite signal by a first amount and deriving by correlation detection in a first correlator an oscillating signal related to the product of said first noise signal in said delayed composite signal and said second noise signal in original said composite signal, simultaneously delaying said composite signal by a second amount and deriving by correlation detection in a second correlator a second oscillating signal related to the product of said first noise signal in said second delayed composite signal and said second noise signal in original said composite signal, simultaneously rectifying and filtering said oscillating signals to derive respective d.c. voltages, subtracting said d.c. voltages to derive the voltage difference therebetween, and utilizing said voltage difference to control the airfoils of said aircraft.

4. A method for use in controlling the flight of an aircraft which includes radiating from the first of a pair of spaced base stations a continuous narrow band noise signal, receiving said noise signal at the second of said pair of base stations, translating said received noise signal in frequency and reradiating same at a controlled interval to merge with said first noise signal to form a composite signal in space, receiving said composite signal at said aircraft, applying said received signal to one input of each of a pair of correlators located therein, applying said composite signal to the remaining input of one of said correlators through a first shunt delay path to cause the correlation detection of said noise signals, applying said composite signal to the remaining input of the remaining one of said correlators through a second shunt delay path to cause the correlation detection of said noise signals, rectifying and filtering the output of each of said correlators, subtracting the filtered outputs of said detectors to provide a difference signal, and utilizing said difference signal to control the airfoils of said aircraft.

5. Method for use in controlling the flight of an aircraft which includes continuously radiating a narrow band noise signal from a master base station, receiving and translating in frequency said signal at a slave base station spaced from said master base station radiating said translated noise frequency signals at a controlled interval therefrom to combine in space with said signal radiated from said master station to form a composite signal therewith, receiving said composite signal at said aircraft and applying the same directly to one input of each of a pair of correlators contained therein, delaying said composite signal by a first amount and applying the same to the remaining input of one of said correlators while simultaneously delaying said composite signal by a second amount and applying the same to the remaining input of the remaining one of said correlators whereby oscillating signals having frequencies equal to the frequency difference between the signals radiated by the master and slave stations are produced, simultaneously rectifying and filtering the respective outputs of said correlators to yield substantially uni-directional voltage, subtracting said uni-directional voltages to provide a difference voltage, and utilizing said difference voltage to control the airfoils of said aircraft.

6. A method for use in controlling the flight of an aircraft which includes radiating from two base stations respectively a first noise signal and a second noise signal identical to said first noise signal but at a slightly different frequency and at a controlled interval with respect thereto, receiving both of said signals at said aircraft as a composite signal wherein said noise signals are time displaced by a finite interval, simultaneously delaying said composite signal by first and second amounts to provide two delayed and one undelayed composite signals which will permit correlation detection of said first noise signal in each of said delayed composite signals with said second noise signal in said undelayed composite signal, simultaneously deriving two oscillating signals by correlation detection of each of said delayed composite signals with said undelayed composite signal, simultaneously rectifying and filtering said oscillating signals to derive respective d.c. voltages, subtracting said d.c. voltages to derive the voltage difference therebetween, utilizing said voltage difference to vary said first and second amounts of delay to cause said voltage difference to approach zero, deriving a signal indicative of the difference between the mean value of said first and second amounts of delay and a reference amount, and utilizing said last derived signal to control the control surfaces of said aircraft.

7. A method for use in controlling the flight of an aircraft which includes radiating from two base stations respectively a first noise signal and a second noise signal identical to said first noise signal but at a slightly different frequency and at a controlled interval with respect thereto, receiving both of said signals at said aircraft as a composite signal wherein said noise signals are time displaced by a finite interval, simultaneously delaying said composite signal by first and second amounts to provide two delayed and one undelayed composite signals which will permit correlation detection of said first noise signal in each of said delayed composite signals with said second noise signal in said undelayed composite signal, simultaneously deriving two oscillating signals by correlation detection of each of said delayed composite signals with said undelayed composite signal, simultaneously rectifying and filtering said oscillating signals to derive respective d.c. voltages, subtracting said d.c. voltages to derive the voltage difference therebetween, adding said d.c. voltages to derive the voltage summation thereof, utilizing said voltage difference to control the airfoils of said aircraft, utilizing said voltage summation to render inoperative said voltage difference when said voltage summation falls below a predetermined value, and further utilizing said voltage summation to initiate and maintain an indication of the last value of said voltage different before the same is rendered inoperative for purposes of controlling said airfoils while said voltage difference is inoperative.

8. An air-borne system for controlling an aircraft in response to a pair of controlled radiated noise signals whenever the aircraft containing said system drifts from a path yielding a predetermined time delay between said signals, comprising an antenna, a receiver having its input connected to said antenna, a pair of correlators having one input of each connected to the output of said receiver, a first delay means having its input connected to said output of said receiver and its output connected to the remaining input of one of said correlators, a second delay means having its input connected to said output of said receiver and its output connected to the remaining input of the remaining one of said pair of correlators, a pair of detectors having their inputs connected respectively to the outputs of said pair of correlators, a pair of filters having their inputs connected respectively to the outputs of said detectors, means joining a like polarity terminal of each of the outputs of said filters, and a utilization means having its input connected to the remaining terminals of said outputs of said filters.

9. An air-borne system for controlling an aircraft in response to a pair of controlled radiated noise signals, comprising an antenna, a receiver having its input connected to said antenna, a pair of correlators having one input of each connected to the output of said receiver, a first variable delay means having its controlled input connected to said output of said receiver and its output connected to the remaining input of one of said correlators, a second variable delay means having its controlled input connected to said output of said receiver and its output connected to the remaining input of the remaining one of said pair of correlators, a pair of detectors having their inputs respectively connected to the outputs of said pair of correlators, a pair of filters having their inputs connected respectively to the outputs of said detectors, means joining a like polarity terminal of each of the outputs of said filters, an airfoil control servomechanism, means joining the remaining terminals of said outputs of said filters to the input of said servomechanism, means joining the output of said servomechanism to the controlling inputs of said variable delay means, and a utilization means having its input connected to said output of said servomechanism.

10. An air-borne system for controlling an aircraft in response to a pair of controlled radiated noise signals whenever the aircraft containing said system drifts from a path yielding a predetermined time delay between said signals, comprising an antenna, a receiver having its input connected to said antenna, a pair of correlators having one terminal of each connected to the output of said receiver, a pair of delay means having their inputs connected to said output of the said receiver and their respective outputs connected to the remaining inputs of said pair of correlators, a pair of detectors having their respective inputs connected to the outputs of said pair of correlators, a summation circuit having its inputs respectively connected to the outputs of said detectors, a difference circuit having its inputs respectively connected to said outputs of said detectors, a variable gain amplifier having its controlled input connected to the output of said summation circuit, an automatic gain control detector having its input connected to the output of said amplifier, means joining the output of said detector to the controlling input of said amplifier, a second variable gain amplifier having its controlled input connected to the output of said difference circuit, an out-of-lane memory circuit having its controlled input connected to the output of said second amplifier, means connecting said output of said automatic gain controlled detector to the controlling input of said second amplifier to the controlling input of said memory circuit, and a utilization means having its input connected to the output of said memory circuit.

11. An air-borne system for controlling an aircraft in response to a pair of controlled radiated noise signals, comprising an antenna, a receiver having its input connected to said antenna, a pair of correlators having one input of each connected to the output of said receiver, a variable delay means having its controlled input connected to said output of said receiver, means connecting the remaining input of one of said correlators to the output of said variable delay means, an incremental delay means serially connected between said output of said variable delay means and the remaining input of the remaining one of said pair of said correlators, a pair of detectors having their inputs connected respectively to the outputs of said pair of correlators, a pair of filters having their inputs connected respectively to the outputs of said detectors, means joining a like polarity terminal of each of the outputs of said filters, and airfoil controlled servomechanism, means joining the remaining terminals of said outputs of said filters to the input of said servomechanism, means joining the output of said servomechanism to the inputs of said delay means and a utilization means having its input connected to said output of said servomechanism.

12. An air-borne system for controlling an aircraft in response to a pair of controlled radiated noise signals whenever the aircraft containing said system drifts from a path yielding a predetermined time-delay between said signals, comprising an antenna, a receiver having its input connected to said antenna, a pair of correlators having one input of each connected to the output of said receiver, a delay means having its input connected to said output of said receiver, means connecting the remaining input of one of said correlators to the output of said delay means, an incremental delay means serially connected between said output of said delay means and the remaining input of the remaining one of said pair of said correlators, a pair of detectors having their inputs connected respectively to the outputs of said pair of correlators, a pair of filters having their inputs connected respectively to the outputs of said detectors, means joining a like polarity terminal of each of the outputs of said filters, a utilization means, means joining the remaining terminals of said outputs of said filters to the input of said utilization means.

13. An air-borne system for controlling an aircraft in response to a pair of controlled radiated noise signals whenever the aircraft containing said system drifts from a path yielding a predetermined time-delay between said signals, comprising an antenna, a receiver having its input connected to said antenna, said receiver comprising an amplifier having a controlling input for varying the bandwidth thereof, a pair of correlators having one input of each connected to the output of said receiver, a delay means having its input connected to said output of said receiver, said delay means providing a delay equal to said predetermined time-delay minus a finite number of incremental time-delays, a second delay means connected to the remaining input of one of said pair of correlators, said second delay providing a delay equal to one incremental time delay greater than said finite number of incremental time-delays, a serially connected number of delay means equal to one less than said finite number, said serially connected delay means individually providing one incremental time-delay, means connecting said serially connected delay means between said second delay means and the remaining input of the remaining one of said pair of correlators, a switching means having its moving contact connected to the output of said first delay means and its fixed contacts respectively connected to each junction in said serially connected delay means and the extremities thereof, a lane width compensating means having its output connected to said controlling input of said amplifier and to said moving contact of said switch whereby said bandwidth of said amplifier is increased as said moving contact moves toward said fixed contact connected to said second delay means, a pair of detectors having their inputs connected respectively to the outputs of said pair of correlators, a pair of filters having their inputs connected respectively to the outputs of said detectors, means joining a like polarity terminal of each of the outputs of said filters, a utilization means, and means joining the remaining terminals of said outputs of said filters to the input of said utilization means.

14. An air-borne system for controlling an aircraft in response to a pair of controlled radiated noise signals whenever the aircraft containing said system drifts from a path yielding a predetermined time-delay between said signals, comprising an antenna, a receiver having its input connected to said antenna, said receiver comprising an amplifier having a controlling input for varying the bandwidth thereof, a pair of correlators having one input of each connected to the output of said receiver, a delay means having its input connected to said output of said receiver, said delay means providing a delay equal to said predetermined time-delay minus a finite number of incremental time-delays, a second delay means connected to the remaining input of one of said pair of correlators, said second delay providing a delay equal to one incremental time delay greater than said finite number of incremental time-delays, a serially connected number of delay means equal to one less than said finite number, said serially connected delay means individually providing one incremental time-delay, means connecting said serially connected delay means between said second delay means and the remaining input of the remaining one of said pair of correlators, a switching means having its moving contact connected to the output of said first delay means and its fixed contacts respectively connected to each junction in said serially connected delay means and the extremities thereof, a lane width compensating means having its output connected to said controlling input of said amplifier and to said moving contact of said switches whereby said bandwidth of said amplifier is increased as said moving contact moves toward said fixed contact connected to said second delay means, a pair of detectors having their respective inputs connected to the outputs of said pair of correlators, a summation circuit having its inputs respectively connected to the outputs of said detectors, a difference circuit having its inputs respectively connected to said outputs of said detectors, a variable gain amplifier having its controlled input connected to the output of said summation circuit, an automatic gain control detector having its input connected to the output of said amplifier, means joining the output of said detector to the controlling input of said amplifier, a second variable gain amplifier having its controlled input connected to the output of said difference circuit, an out-of-lane memory circuit having its controlled input connected to the output of said second amplifier, means connecting said output of said automatic gain controlled detector to the controlling input of said second amplifier and to the controlling input of said memory circuit, and a utilization means having its input connected to the output of said memory circuit.

15. A method of guiding a vehicle to a target by advanced hyperbolic guidance techniques, utilizing first and second spaced base stations, comprising the steps of radiating first and second noise signals from said first and second stations, respectively, with the noise signals being identical except for being centered at different frequencies, and with the noise signal from said second station being delayed with respect to the noise signal from said first station so that contours of constant delay constitute a family of hyperbolas, receiving in the vehicle to be controlled the signals from said base stations, said signals being received as a composite signal in which the individual noise signals are time-displaced by a finite interval, creating delayed signals in the vehicle by delaying the composite signal by a first amount equal to the chosen delay in the signals from said stations minus a small increment of delay, and by a second amount equal to the chosen delay in the signals from said stations plus a small increment of delay, multiplying each of said delayed signals by the undelayed signal from said stations and generating and filtering the output signals which are at a frequency equal to the difference between the signals radiated by said stations, the magnitude of the difference frequency signals being a function of the displacement of the vehicle from the desired hyperbola established by said stations, detecting said difference frequency signals, and taking the difference between the d.c. voltages generated by detection in order to provide an error signal which can be utilized to operate the control surfaces of the vehicle to cause the vehicle to seek the desired hyperbola generated by said stations.

16. A method of guiding a vehicle to a target by advanced hyperbolic guidance techniques, utilizing a reference base station and at least two other base stations, with the stations being arranged in the form of first and second pairs of spaced base stations that are not placed in a straight line, said method comprising the steps of radiating noise signals from said stations, with the noise signals being identical except for being centered at different frequencies, and with the noise signals from said other base stations being delayed by different amounts with respect to noise signals from said reference station so that contours of constant delay constitute a pair of intersecting hyperbolic grids, receiving in the vehicle to be controlled the signals from said base stations, said signals being received as a composite signal in which the individual noise signals are time-displaced by a finite intervals, creating delayed signals in the vehicle by delaying the composite signal by a first amount equal to the chosen delay in the signals from said first pair of stations minus a small increment of delay, and by a second amount equal to the chosen delay in the signals from said first pair of stations plus a small increment of delay, multiplying each of said delayed signals by the undelayed signal from said first pair of stations, and generating and filtering the output signals which are at a frequency equal to the difference between the signals radiated by said first pair of base stations, the magnitude of the difference frequency signals being a function of the displacement of the vehicle from the desired hyperbola established by said first pair of stations, detecting said difference frequency signals, and taking the difference between the d.c. voltages generated by detection in order to provide an error signal which can be utilized to operate the control surfaces of the vehicle to cause the vehicle to seek the desired hyperbola generated by said first pair of base stations, performing similar operations of delaying, multiplying, filtering, detecting, and comparing a pair of signals at the difference frequency associated with said second pair of base stations to generate control signals which indicate when a particular contour of constant delay established by said second pair of stations is crossed by the vehicle, and utilizing said control signals to cause said vehicle to contact the target.

* * * * *